Patented Mar. 8, 1949

2,463,596

UNITED STATES PATENT OFFICE 2,463,596

PROCESS OF PREPARING POLYCYCLO-PENTADIENE IN THE PRESENCE OF A HALOALKENE

George B. Butler, Philadelphia, Pa., assignor, by mesne assignments, to Rohm & Haas Company, Philadelphia, Pa., a corporation of Delaware No Drawing. Application November 30, 1945, Serial No. 632,112

3 Claims. (Cl. 260—92.6)

This invention concerns a method for forming chain polymers of high molecular weight from cyclopentadiene. It relates further to soluble polycyclopentadienes of higher molecular weights than have been provided by previously practiced methods of polymerization. These polymers can be converted to cross-linked, insoluble products which are more resistant to aging and oxidation than previously known polycyclopentadienes.

Polymerization of cyclopentadiene has been effected in the presence of halides of the amphoteric elements, such as tin tetrachloride, aluminum bromide, aluminum chloride, boron chloride, boron fluoride, or the like, usually in the presence of an indifferent solvent such as benzene, toluene, naphtha, chloroform, or the like. The polymers obtained give hard, adherent coatings which change, however, on aging, becoming brittle, probably through oxidation changes.

According to this invention, high molecular weight polymers of cyclopentadiene are produced by effecting the polymerization in a solvent of the formula:

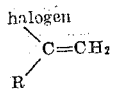

wherein R is a lower alkyl group, such as methyl, ethyl, or butyl. While these unsaturated organic halides might appear to be capable of forming copolymers with the cyclopentadiene, they fail to do so. Their effect would seem to involve a chain transfer mechanism in which the halogen in the 2-position attaches itself to a cyclopentadiene molecule to activate it. Another possible explanation of the effect obtained by the use of these 2-haloalkenes rests upon possible formation of a complex with the catalysts, which is more active than the added catalyst itself. Effective solvents for the purposes of this invention include 2-chloropropene, 2-chlorobutene-1, 2-chloropentene-1, 2-bromopropene-1, 2-bromopentene-1, and 2-iodopropene.

In the preparation of high molecular weight polymers from cyclopentadiene, the polymerization is effected by mixing cyclopentadiene, 2-chloropropene-1, 2-chlorobutene-1, or the like, and a polymerization catalyst while the temperature is held below about 25° C. Temperatures of —80° C. to 25° C. are particularly suitable. In the preferred order of mixing, the catalyst is dispersed in the haloalkene and the cyclopentadiene added thereto while the temperature is controlled at a desired level.

The usual metallo-halide catalysts are effective in this reaction and, as indicated above, these include halides of both metals and metalloids. These are usually termed halides of amphoteric elements. The catalyst of first choice is boron trifluoride, particularly in the form of one of its complexes with oxygenated organic compounds, such as carboxylic acids, ketones, aldehydes, alcohols, and ethers. Such catalysts are usually made by running boron trifluoride into an excess of the organic component. Compounds such as $BF_3.2CH_3COOH$, $BF_3.2ClCH_2COOH$,
$BF_3.CH_3COCH_3$, $BF_3.C_4H_9OH$, and $BF_3.(C_4H_9)_4O$ are formed. The use of excess organic solvent is convenient to assist in controlling the reaction and permits full control of the temperature of the reaction mixture within a desired range.

When polymerization has run its course, the catalyst is destroyed by addition of water or alcohol, preferably together with a base to combine with the catalyst, such as lime, sodium or potassium hydroxide, soda ash, etc., or an organic amine such as pyridine, morpholine, triethanolamine, butylamine, or the like. It is generally desirable to replace the chlorinated solvent with one such as naphtha, benzene, or toluene.

The polymers formed in this way are characterized by imparting to their solutions viscosities which are five or more times those imparted by the same weight of the soluble polycyclopentadienes known heretofore. They are further characterized by the fact that coatings formed from solutions thereof are highly resistant to aging. Overbaking of these coatings for an hour at 180° C. fails to render them brittle or to cause them to lose their adhesion to metals. The long-chained polymers formed according to this invention take up less oxygen than the polymers of the prior art.

The following examples, giving additional details of the process of this invention, are cited by way of illustration.

Example 1

To twenty-five parts of 2-chloroproylene cooled to 20° C. was added one part of a solution composed of 10% $BF_3$ in dibutyl ether. Twenty-five parts of freshly distilled cyclopentadiene was then added as rapidly as possible while the temperature was kept below 10° C. A milky solution was formed as the monomer polymerized, indicating that the polymer is insoluble in this solvent. Stirring was continued at 0°-10° C. for three hours. One hundred parts of xylene was then added to dissolve the entire mass. One part of water and one part of lime were then added to remove the catalyst. The solution was dried by addition of five parts of anhydrous Na₂SO₄. The 2-chloropropylene was removed under vacuum at 35° C. and the solution filtered to remove the insoluble salts. One hundred twenty-five parts of a solution containing 17.5% solids and having a viscosity of 1.65 poises was obtained. The polymer contained no chlorine.

*Example 2*

To two hundred fifty parts of 2-chloropropylene, cooled to 0°-5° C., was added five parts of catalyst composed of a 10% solution of BF₃ in dibutyl ether. One hundred twenty-five parts of freshly distilled cyclopentadiene was then added over a period of one hour while the temperature was maintained in the range of 0°-10° C. Stirring was continued at this temperature for four hours. A heterogeneous, soupy mass was obtained. This was then dissolved completely by addition of two hundred eighty parts of a highly aromatic naphtha. The catalyst was neutralized by addition of twenty parts of a 25% solution of butyl hydroxy dimethylbenzylamine in naphtha. The 2-chloropropylene solvent was removed under vacuum at temperatures up to 35° C. Four hundred fifteen parts of a clear resin solution containing 30% solids and having a viscosity of 10.7 poises was obtained.

A resin prepared by the above procedure, in which methallyl chloride was substituted for 2-chloropropylene as solvent, had a viscosity of only 2.25 poises at 30% solids. Resins prepared under similar conditions, using hydrocarbons as solvents, have viscosities ordinarily in the range of 1-2 poises at 30% solids.

*Example 3*

To four hundred fifty parts of 2-chloropropylene, cooled to 5° C., was added with stirring two parts of the equimolecular complex of boron trifluoride and dibutyl ether. This solution was then cooled to —75° C. in an acetone-dry ice bath. One hundred fifty parts of a 60% solution of freshly distilled cyclopentadiene in 2-chloropropylene was added as rapidly as possible, while the temperature was held below —70° C. Stirring was continued at this temperature for three hours. Eight hundred ten parts of toluene was then added and the solution warmed up to 0° C. Two parts of water and two parts of lime were added to destroy the catalyst, and the solution was dried by addition of 10 grams of anhydrous sodium sulfate and stirring continued for one-half hour. The 2-chloropropylene solvent was removed under vacuum at temperatures up to 35° C. After filtration to remove the insoluble salts, a solution containing 7.1% resin and having a viscosity of 1.65 poises was obtained.

Films of the resin from Example 2 were formed on sheet metal panels under carefully controlled conditions with the aid of a Filmograph, an apparatus for laying down thin, reproducible coatings on surfaces. Films were likewise prepared with polycyclopentadiene made in a hydrocarbon solvent in the conventional manner. The two sets of films were cured under the same conditions. The panels were then weighed, after which they were baked in an oven at 180° C. up to a total of three hours, a time shown by previous tests to be sufficient for essentially complete absorption of oxygen.

At the end of one hour of baking, the panels were removed from the oven and tested for film flexibility by a quick bend over a one-eighth inch mandrel. The films from the resin formed in hydrocarbons shattered and flaked off, while the films from the polymers of this invention remained intact and showed no breaks. At the end of two or of three hours of baking at 180° C., films formed from polymers prepared in 2-chloropropene were far more intact than were films from the polymers formed in hydrocarbons at the one-hour test. Within three hours, absorption of oxygen was found to be essentially complete in all cases. The panels remaining were weighed. The films from the resins of this invention had gained 13.5% in weight, while films from prior art resins had gained 15.1% in weight. Yet the differences in film strength and adhesion were surprisingly great, indicating the considerable difference in the characters of the two types of polymers.

I claim:

1. A process of preparing polycyclopentadiene of high molecular weight which comprises dissolving cyclopentadiene in a 2-haloalkene-1 from the class consisting of 2-chloropropene, 2-chlorobutene-1, 2-chloropentene-1, 2-bromopropene, 2-bromopentene-1, and 2-iodopropene and polymerizing the dissolved cyclopentadiene at a temperature of —80° C. to 25° C. with a catalyst selected from the class consisting of tin tetrachloride, aluminum bromide, aluminum chloride, boron chloride, and boron fluoride.

2. A process of preparing polycyclopentadiene of high molecular weight which comprises dissolving cyclopentadiene in a 2-haloalkene-1 from the class consisting of 2-chloropropene, 2-chlorobutene-1, 2-chloropentene-1, 2-bromopropene, 2-bromopentene-1, and 2-iodopropene and polymerizing the dissolved cyclopentadiene at a temperature of —80° C. to 25° C. with a boron fluoride catalyst.

3. A process of preparing polycyclopentadiene of high molecular weight which comprises dissolving cyclopentadiene in 2-chloropropene and polymerizing the dissolved cyclopentadiene at a temperature of —80° C. to 25° C. with a boron fluoride catalyst.

GEORGE B. BUTLER.

REFERENCES CITED

The following references are of record in the file of this patent:

UNITED STATES PATENTS

| Number | Name | Date |
| --- | --- | --- |
| 2,356,494 | Trepp | Aug. 22, 1944 |
| 2,359,810 | Trepp | Oct. 10, 1944 |
| 2,384,141 | Soday | Sept. 4, 1945 |
| 2,387,626 | Ward | Oct. 23, 1945 |